(12) United States Patent
Yamakawa et al.

(10) Patent No.: US 6,470,742 B1
(45) Date of Patent: Oct. 29, 2002

(54) FLOW SENSOR

(75) Inventors: Tomoya Yamakawa, Tokyo (JP);
Motohisa Taguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/359,636

(22) Filed: Jul. 26, 1999

(30) Foreign Application Priority Data

Jan. 25, 1999  (JP) .......................................... 11-015269

(51) Int. Cl.[7] ................................................ G01F 1/68
(52) U.S. Cl. ................................................... 73/204.26
(58) Field of Search ........................ 73/204.26, 204.25, 73/204.19, 204.15, 204.18, 170.12

(56) References Cited

U.S. PATENT DOCUMENTS 4,885,937 A * 12/1989 Tanaka et al. ............ 73/170.12
5,936,157 A * 8/1999 Yamashita et al. ........ 73/204.26
5,965,811 A * 10/1999 Kawai et al. ............. 73/204.26

FOREIGN PATENT DOCUMENTS

| JP | 4-230808 | 8/1992 |
| JP | 9-43018 | 2/1997 |

* cited by examiner

Primary Examiner—Benjamin R. Fuller
Assistant Examiner—Octavia Davis
(74) Attorney, Agent, or Firm—Sughrue Mion, PLLC

(57) ABSTRACT

To obtain a flow sensor having excellent responsibility, sensitivity and reliability and high flow detection accuracy by suppressing the deformation of a diaphragm, first additional patterns are formed on a side opposite to connection patterns of a heating element so that thin film patterns formed on the diaphragm become almost symmetrical, thereby suppressing the deformation of the diaphragm caused by internal stress between a base film or protective film and a platinum film forming the thin film patterns and the differences of mechanical or thermal properties therebetween.

22 Claims, 11 Drawing Sheets

FLOW SENSOR

BACKGROUND OF THE INVENTION

1. Field of the Invention

The present invention relates to a flow sensor for measuring the flow velocity or flow rate of a fluid such as intake air for an internal combustion engine. More specifically, it relates to a flow sensor, equipped with a heating element, for measuring the flow rate of a fluid based on a heat transfer phenomenon from the heating element or a part heated by the heating element to the fluid.

2. Description of the Prior Art

FIGS. 13(a) and 13(b) are diagrams showing the constitution of a flow detection element (diaphragm sensor) 51 used in a conventional flow sensor disclosed by Japanese Laid-open Patent Application No. 4-230808, for example. FIG. 13(a) is a plan view and FIG. 13(b) is a sectional view cut on line D—D of FIG. 13(a). In FIGS. 13(a) and 13(b), reference numeral 1 denotes a plate substrate made from a silicon semiconductor. A cavity 12 which has a trapezoidal section and does not communicate with the front side of the plate substrate 1 is formed in a center portion of the rear side of the plate substrate 1 by anisotropic etching to fabricate a thin diaphragm 13 in the plate substrate 1 on the bottom side of the cavity 12, that is, the front side of the plate substrate 1.

A thin film heating element 3 is formed at a center portion of the surface of the diaphragm 13 and thin film resistance thermometers 52 and 53 are formed symmetrical on both sides of the heating element 3 at a predetermined interval therebetween. Slit portions 54a and 54b which are belt-like holes and extend through the diaphragm 13 are formed between the heating element 3 and the resistance thermometers 52 and 53 in a longitudinal direction, and slit portions 55a and 55b which consist of a plurality of square holes extending through the diaphragm 13 and aligned with one another are formed outside the resistance thermometers 52 and 53 in a longitudinal direction. Slit portions 56c, 56d, 57c and 57d which are holes extending through the diaphragm 13 are formed at both ends in a longitudinal direction of the heating element 3 and the resistance thermometers 52 and 53, respectively. These slit portions 54a to 57d are formed by general photolithography or wet or dry etching.

In the above FIGS. 13(a) and 13(b), the electrodes of the heating element 3 and the resistance thermometers 52 and 53 and thin-film conductor patterns forming the power lines of the heating element 3 and the resistance thermometers 52 and 53 formed on the plate substrate 1 are omitted.

A description is subsequently given of the operation of the above flow detection element 51 of the prior art.

The front side (heating element 3 side) of the flow detection element 51 is made parallel to the flow passage of a fluid to be measured, the longitudinal directions of the heating element 3 and the resistance thermometers 52 and 53 are made perpendicular to the flow of the fluid, and a current to be applied to the heating element 3 is controlled such that the temperature of the heating element 3 should be higher than the temperature of the fluid by a predetermined value. Since the resistance thermometers 52 and 53 are arranged symmetrical about the heating element 3, when the fluid does not flow (flow velocity is zero), the temperatures of the above resistance thermometers 52 and 53 are equal to each other.

When the fluid flows in a direction shown by an arrow V, the resistance thermometer 52 on an upstream side is cooled and the temperature thereof becomes lower than that when the flow velocity is zero. A reduction in the temperature of the above resistance thermometer 52 becomes greater as the flow velocity increases. Meanwhile, since the resistance thermometer 53 on a downstream side is located on the downstream side of the heating element 3, when the flow velocity is the same, the temperature of the resistance thermometer 53 does not become as low as that of the resistance thermometer 52 on the upperstream side. Therefore, there is a temperature difference between the resistance thermometer 52 on the upperstream side and the resistance thermometer 53 on the downstream side according to the flow velocity of the fluid. Then, by detecting a resistance difference between the resistance thermometer 52 and the resistance thermometer 53, which corresponds to the above temperature difference, by means of detection means such as an unshown Wheatstone bridge circuit incorporating the resistance thermometers 52 and 53, the flow velocity of the fluid can be measured.

Thus, in the above prior art, changes in output caused by the adhesion of dust are reduced by forming the cavity 12 in the rear side of the plate substrate 1 to fabricate the thin diaphragm 13. Further, the slit portions 54a to 57d are formed in the diaphragm 13 to reduce a heat flow from the heating element 3 to the resistance thermometers 52 and 53, thereby suppressing a rise in the temperatures of the resistance thermometers 52 and 53 and reducing a heat flow from the heating element 3 to the plate substrate 1 to improve sensitivity.

To obtain high sensitivity and responsibility for a flow detection element having such a diaphragm structure, the heat responsibility of the diaphragm 13 must be improved by reducing the thickness of the diaphragm 13 regardless of the existence of the slit portions. However, when the thickness of the diaphragm 13 is reduced, the ratio of the thickness of the diaphragm 13 to the thickness of a heat sensitive resistor film forming the heating element 3 and the resistance thermometers 52 and 53 becomes large. Therefore, as the thickness of the diaphragm 13 decreases, the difference of a material structure in a thickness direction between a portion with the heat sensitive resistor film and a portion without the heat sensitive resistor film becomes larger, whereby the diaphragm 13 deforms (initial deformation) when the heat sensitive resistor film and the cavity are formed. This deformation is caused by the difference of internal stress between the materials of the films. When the initial deformation of the diaphragm 13 occurs and electricity is applied to the heating element 3 to generate heat, the deformation of the diaphragm 13 becomes larger due to the differences of thermal or mechanical properties between the material of the diaphragm 13 (silicon which is the material of the substrate) and the material of the heat sensitive resistor film such as the heating element 3 formed thereon (for example, a metal material such as platinum). When the deformation is large, large stress is generated between the diaphragm 13 and the heat sensitive resistor film, thereby causing the heat sensitive resistor film forming the heating element 3 and the resistance thermometers 52 and 53 to be separated from the surface of the diaphragm 13. This exerts an adverse effect on the detection characteristics of the flow sensor.

Further, when the large deformation of the diaphragm 13 occurs, there are differences in the amount of deformation of the film when it serves as a flow sensor due to differences in the thermal or mechanical properties of the film, which may influence the detection characteristics of the flow meter and make accurate flow detection impossible.

If the above deformation is asymmetrical within the plane of the diaphragm 13 at the time of forming thin-film patterns or applying electricity for heating, the separation of the film and the difference of deformation become more marked, thereby deteriorating the detection characteristics of the flow sensor.

In view of the above problems of the prior art, it is an object of the present invention to provide a flow sensor which has excellent responsibility, sensitivity and reliability and high flow detection accuracy by suppressing the deformation of a diaphragm.

SUMMARY OF THE INVENTION

According to a first aspect of the present invention, there is provided a flow sensor in which additional patterns are formed on a diaphragm or a diaphragm and a portion therearound so that thin film patterns formed on the surface of the diaphragm formed in a plate substrate of a flow detection element become almost symmetrical on the diaphragm.

According to a second aspect of the present invention, there is provided a flow sensor in which the additional patterns are formed at positions where they are almost symmetrical to connection patterns on the diaphragm so that the thin film patterns formed on the diaphragm become almost symmetrical on the diaphragm.

The additional patterns of the second aspect of the present invention will be referred to as "first additional patterns" hereinafter.

According to a third aspect of the present invention, there is provided a flow sensor in which the first additional patterns are dummy patterns which do not contribute to power supply to a heating element.

According to a fourth aspect of the present invention, there is provided a flow sensor in which the dummy patterns (first additional patterns) are connected to the pattern of the heating element.

According to a fifth aspect of the present invention, there is provided a flow sensor in which the dummy patterns (first additional patterns) are not connected to the pattern of the heating element but to the ground of a flow detection circuit or the shielding member of the flow sensor.

According to a sixth aspect of the present invention, there is provided a flowsensor in which the connection patterns and the first additional patterns are formed on lines connecting the corner portions of the pattern of the heating element and the corner portions of the diaphragm, respectively.

According to a seventh aspect of the present invention, there is provided a flow sensor in which the connection patterns are formed to surround at least part of the pattern of the heating element.

According to an eighth aspect of the present invention, there is provided a flow sensor in which the total area of the connection patterns and the first additional patterns is half or more the area of the diaphragm excluding the pattern of the heating element.

According to a ninth aspect of the present invention, there is provided a flow sensor in which the connection patterns are combined with the first additional patterns.

According to a tenth aspect of the present invention, there is provided a flow sensor in which the width of the first additional patterns is larger than the width of the pattern of the heating element and the first additional patterns form part of a current path for the heating element.

According to an eleventh aspect of the present invention, there is provided a flow sensor in which the pattern of the heating element, the connection patterns and the first additional patterns are formed of the same metal layer.

According to a twelfth aspect of the present invention, there is provided a flow sensor in which the thickness of the pattern of the heating element, the thickness of the connection patterns and the thickness of the first additional patterns are ⅕ or less the thickness of the diaphragm.

According to a thirteenth aspect of the present invention, there is provided a flow sensor in which the additional patterns are dummy patterns formed in an area other than the power lines of the diaphragm and formed at positions where they are almost symmetrical on the diaphragm.

The additional patterns of the thirteenth aspect of the present invention will be referred to as "second additional patterns" hereinafter.

According to a fourteenth aspect of the present invention, there is provided a flow sensor in which third additional patterns formed at the periphery of the diaphragm and connection patterns for connecting the third patterns to the dummy patterns (second additional patterns) are formed, and the total of the widths of the connection patterns at the boundary of the diaphragm is half or less the whole circumference of the boundary of the diaphragm.

According to a fifteenth aspect of the present invention, there is provided a flow sensor in which the third additional patterns are not connected to the pattern of the heating element but to the ground of a flow detection circuit or the shielding member of the flow sensor.

According to a sixteenth aspect of the present invention, there is provided a flow sensor in which the connection patterns are laid over the corner portions of the diaphragm.

According to a seventeenth aspect of the present invention, there is provided a flow sensor in which the dummy patterns (second additional patterns) are formed to surround at least part of the pattern of the heating element.

According to an eighteenth aspect of the present invention, there is provided a flow sensor in which the total area of the dummy patterns (second additional patterns) on the diaphragm is half or more the area of the diaphragm excluding the pattern of the heating element.

According to a nineteenth aspect of the present invention, there is provided a flow sensor in which the pattern of the heating element and the dummy patterns (second additional patterns) are formed of the same metal layer.

According to a twentieth aspect of the present invention, there is provided a flow sensor in which the thickness of the pattern of the heating element and the thickness of the dummy patterns (second additional patterns) are ⅕ or less the thickness of the diaphragm.

The above and other objects, features and advantages of the invention will become more apparent from the following description when taken in conjunction with the accompanying drawings.

BRIEF DESCRIPTION OF THE ACCOMPANYING DRAWINGS

FIGS. 1(*a*) and 1(*b*) are diagrams showing the constitution of a flow detection element used in a flow sensor according to Embodiment 1 of the present invention;

FIGS. 2(*a*) and 2(*b*) are diagrams showing the constitution of the flow sensor of =b 10 Embodiment 1;

Figure 10A:
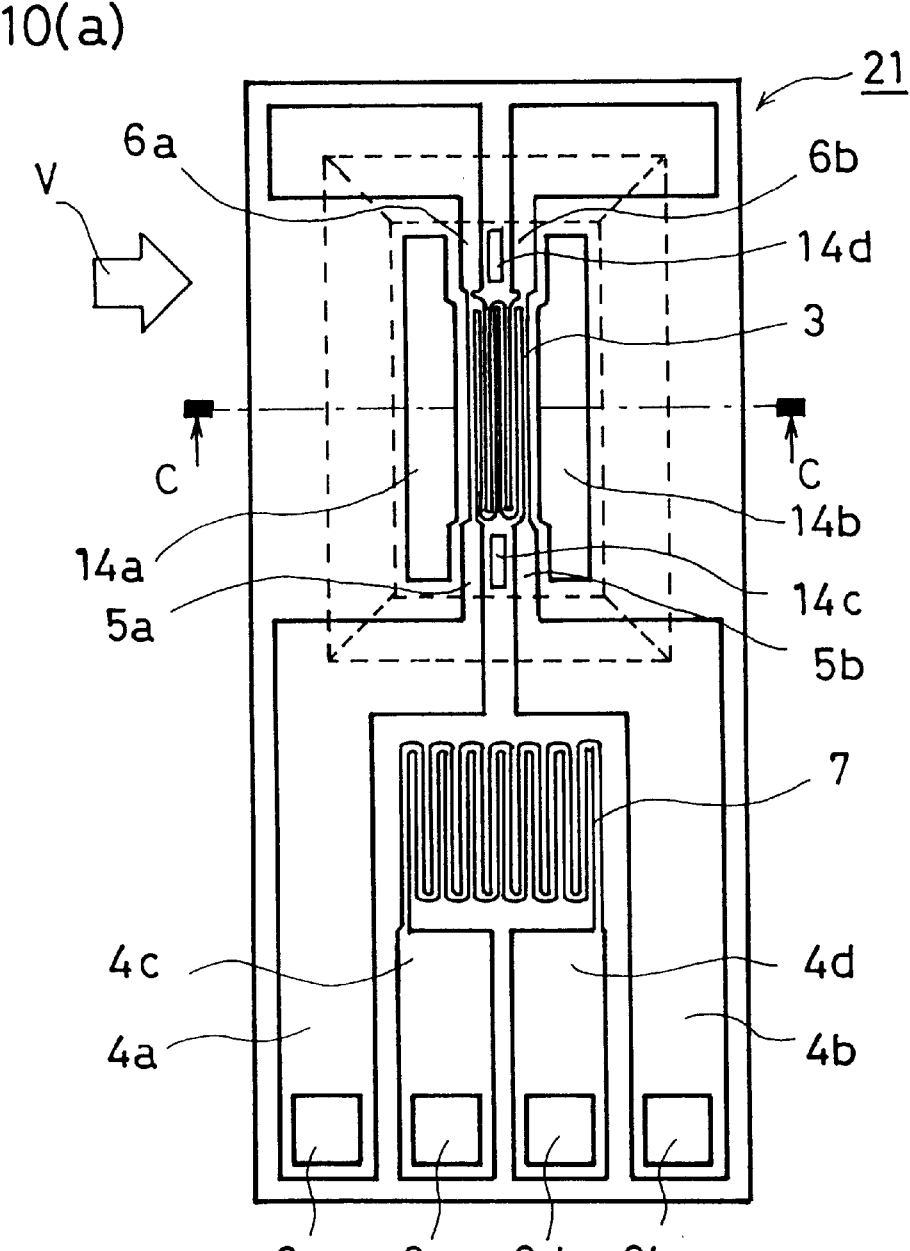
Figure 10B:
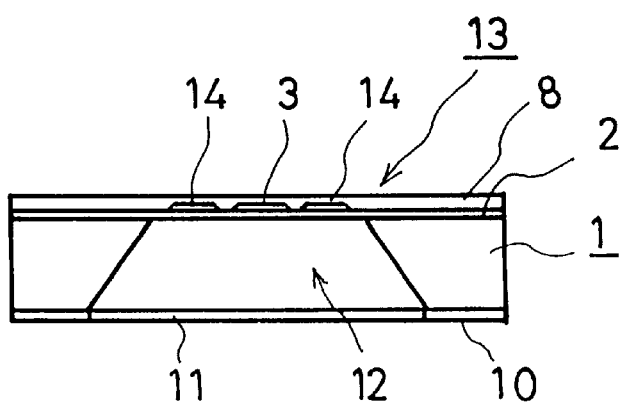
Figure 11:
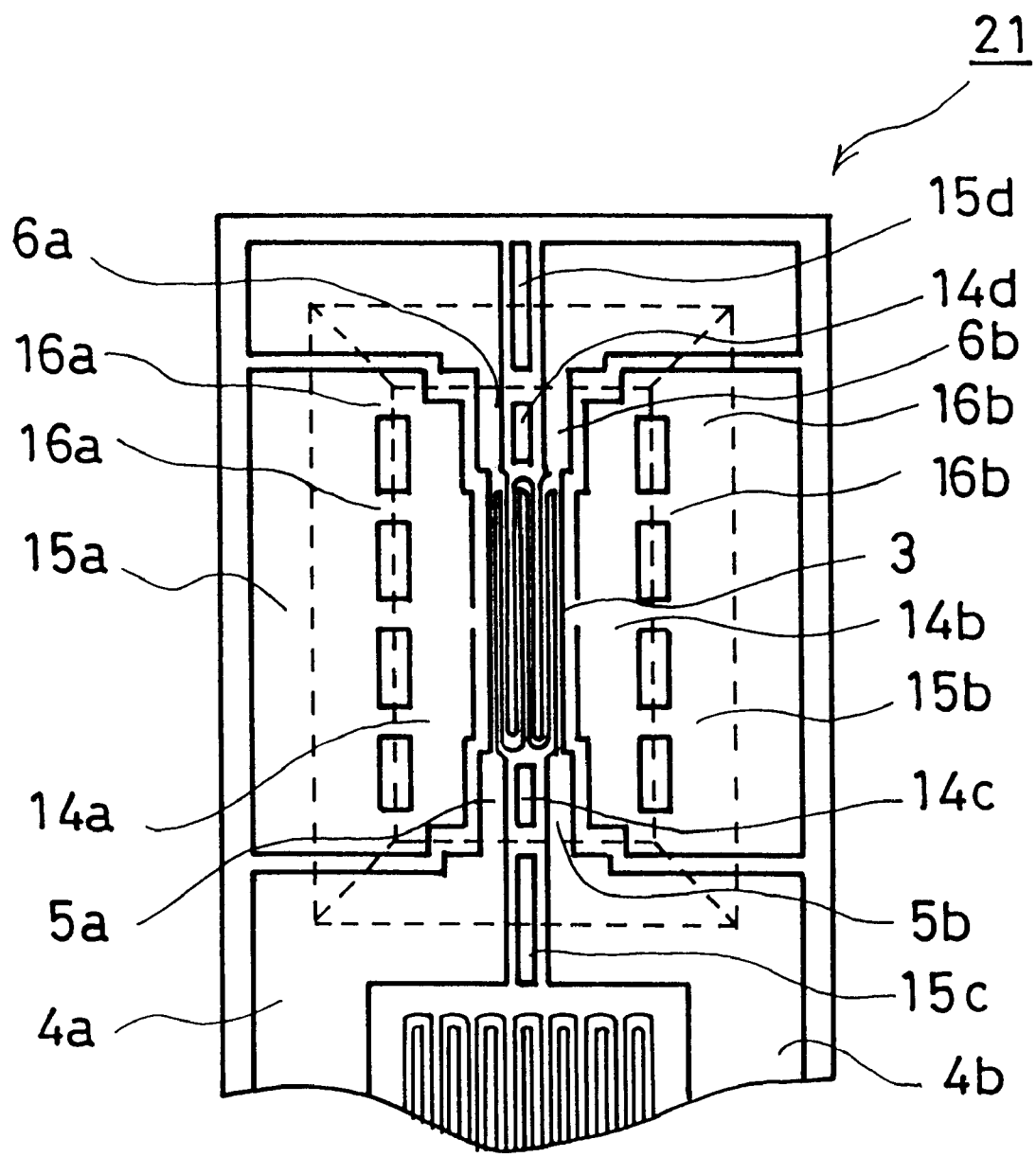
Figure 12:
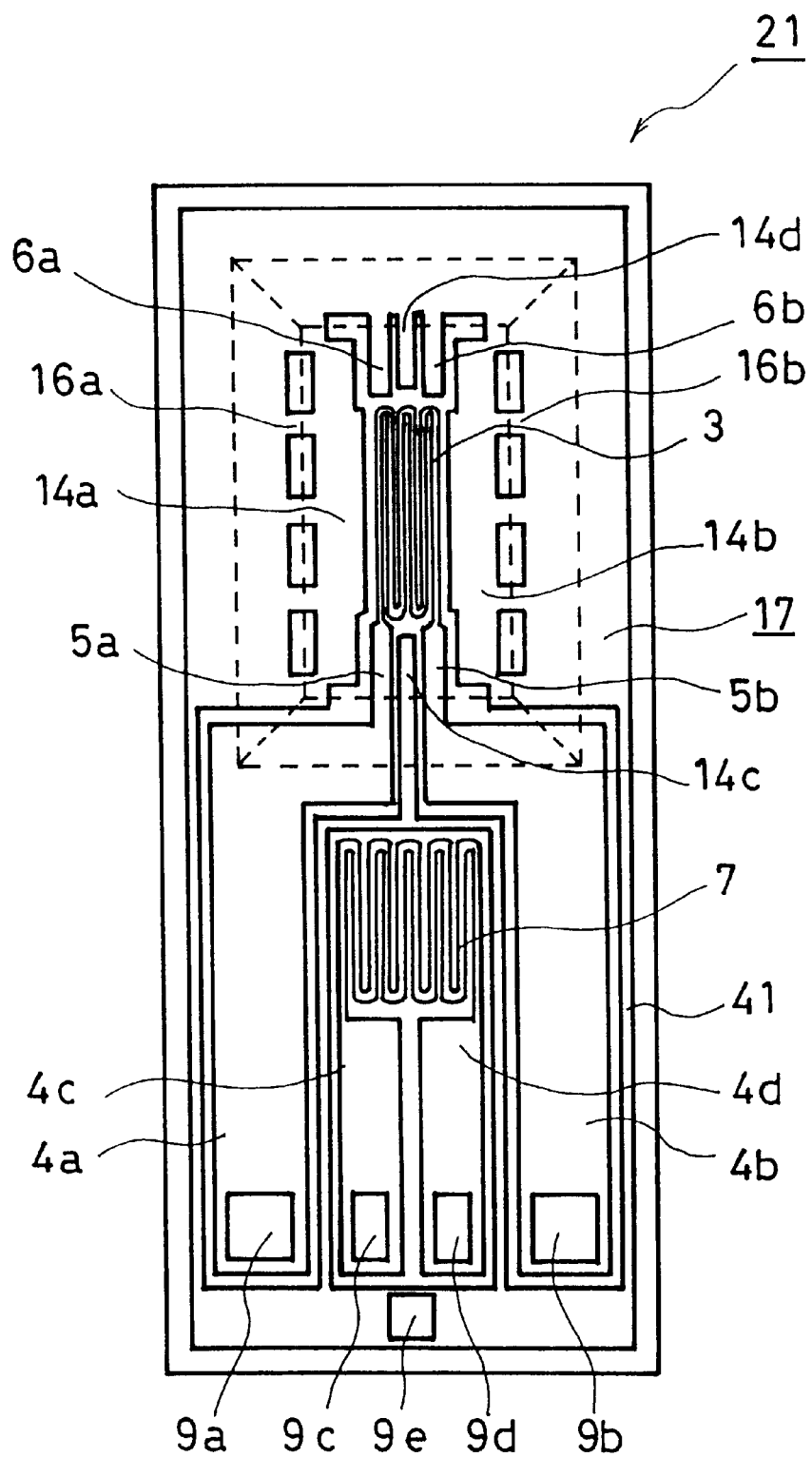
Figure 13A:
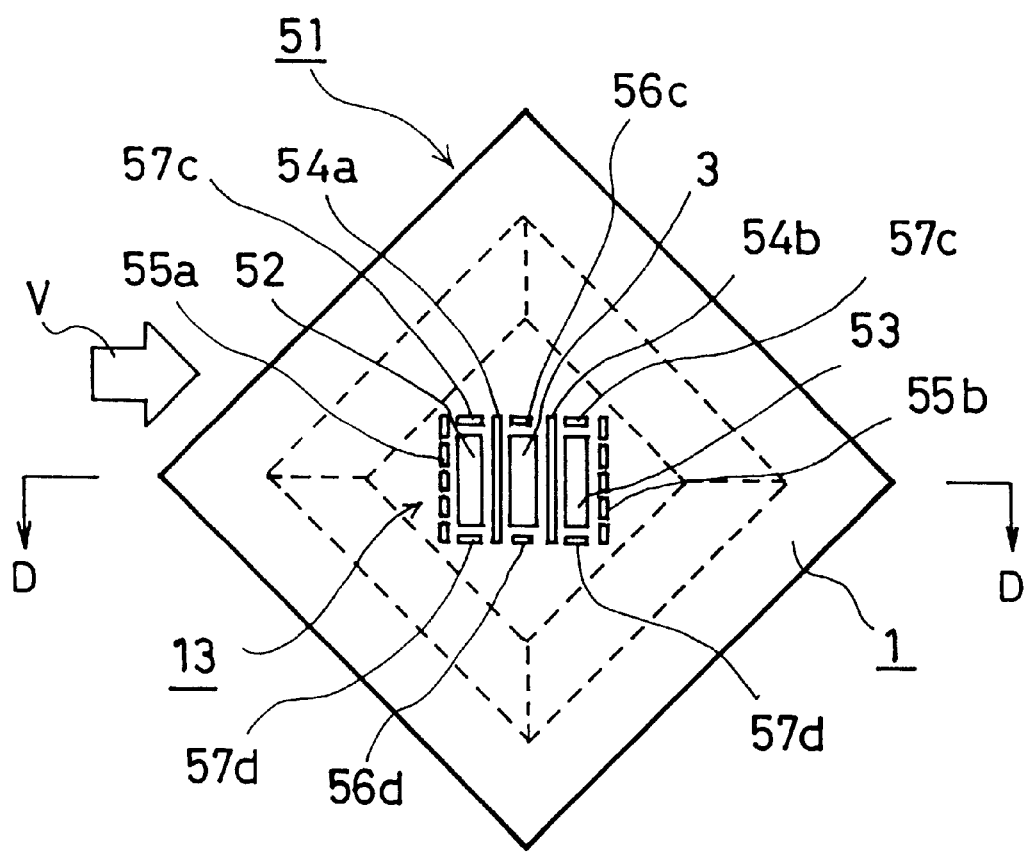
Figure 13B:
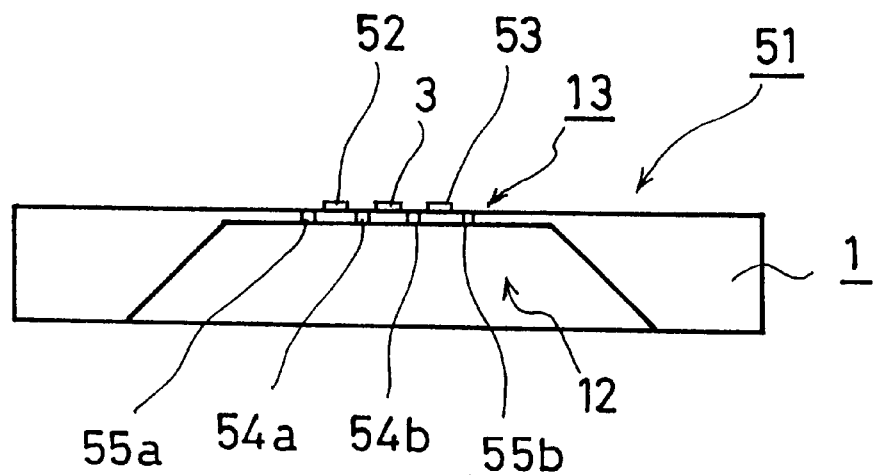

FIGS. 10(a) and 10(b) are diagrams showing the constitution of a flow detection element used in a flow sensor according to Embodiment 8 of the present invention;

FIG. 11 is a diagram showing a diaphragm and a portion therearound of a flow detection element according to Embodiment 9 of the present invention;

FIG. 12 is a plan view showing the constitution of a flow detection element according to Embodiment 10 of the present invention; and FIGS. 13(a) and 13(b) are diagrams showing a flow detection element of the prior art.

DETAILED DESCRIPTION OF THE PREFERRED EMBODIMENTS

Preferred Embodiments of the present invention will be described hereinunder with reference to the accompanying drawings.

Embodiment 1

Figure 1A:
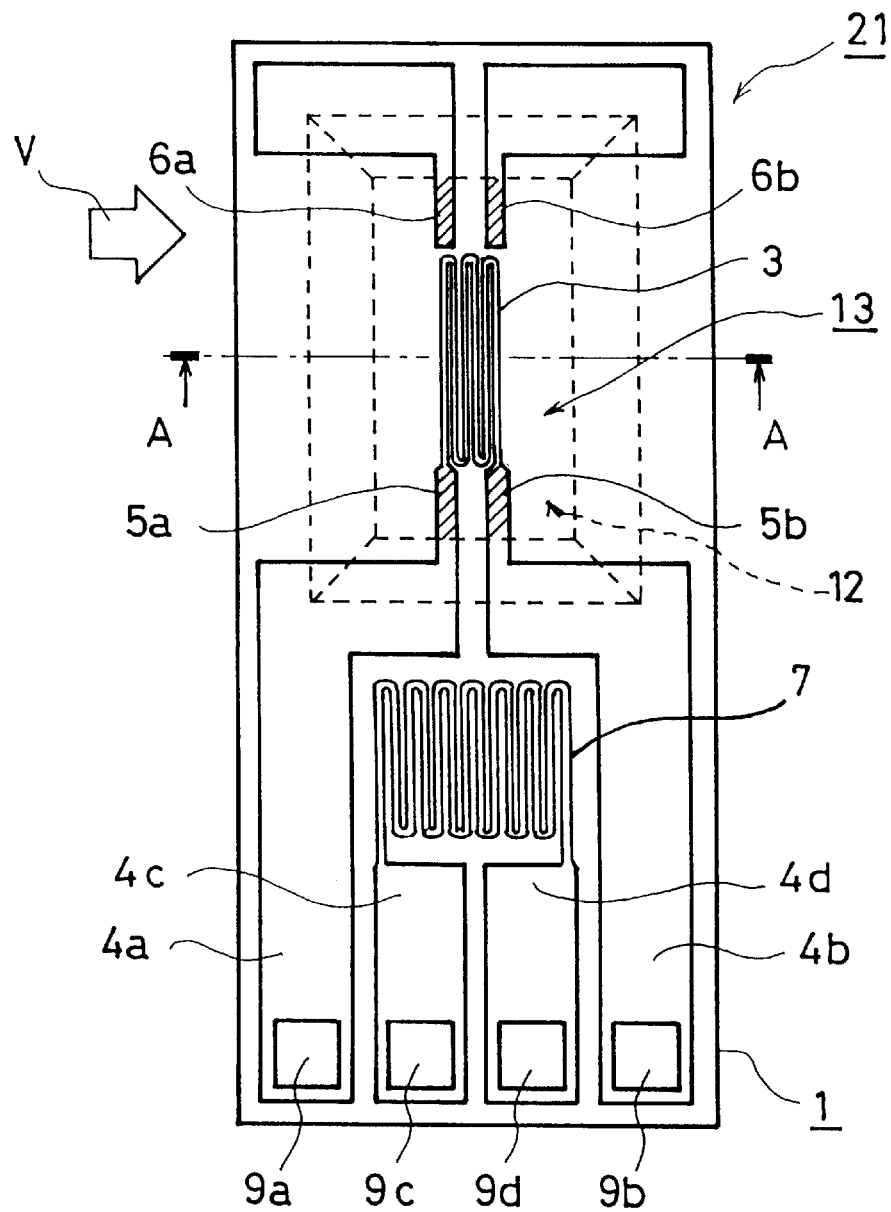
Figure 1B:
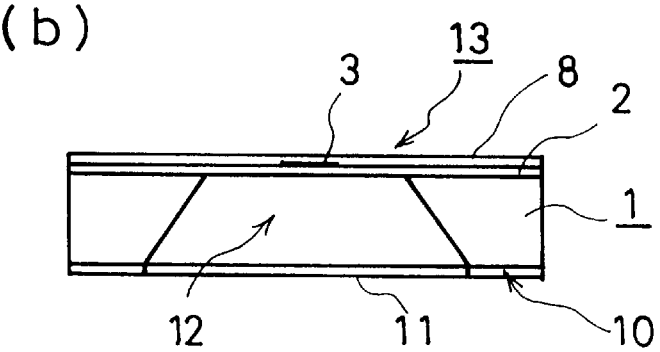

FIGS. 1(a) and 1(b) are diagrams showing the constitution of a flow detection element 21 used in a flow sensor according to Embodiment 1 of the present invention. FIG. 1(a) is a plan view and FIG. 1(b) is a sectional view cut on line A—A of FIG. 1(a). In FIGS. 1(a) and 1(b), reference numeral 1 denotes a silicon plate substrate having a thickness of about 0.4 mm, 2 a 1 μm-thick insulating base film made from silicon nitride and formed on the surface of the plate substrate by sputtering or CVD, and 3a 0.2 μm-thick heating element made of a platinum heat sensitive resistor film and formed on the base film 2 by vapor deposition or sputtering. This heating element 3 is fabricated by forming the heat sensitive resistor film on the base film 2 and then forming a pattern (to be referred to as "heating pattern" hereinafter) for the heating element 3 by photolithography and wet or dry etching. A heating portion of the heating element 3 formed by patterning measures 0.5 mm in a transverse direction and 1.5 mm in-a longitudinal direction.

Lead patterns 4a and 4b for supplying power to the heating element 3 and connection patterns 5a and 5b for connecting the heating element 3 to the lead patterns 4a and 4b are formed by the same method as that used to form the above heating pattern, and first additional patterns 6a and 6b are formed on a side opposite to the connection patterns 5a and 5b side of the heating element 3 with the heating element 3 interposing therebetween. The first additional patterns 6a and 6b are dummy patterns which do not constitute a power line for supplying power to the heating element 3.

A fluid temperature measuring element 7 formed of a heat sensitive resistor film and lead patterns 4c and 4d for supplying power to the fluid temperature measuring element 7 are formed by the same method.

A 1 μm-thick insulating protective film 8 made from silicon nitride is formed on the above heating element 3 and the fluid temperature measuring element 7 by sputtering or CVD.

The heating element 3 and the fluid temperature measuring element 7 are connected to electrodes 9a to 9d for electrically connecting these to the outside of the flow detection element 21 by the lead patterns 4a to 4d, respectively. The protective film 8 is eliminated from the electrodes 9a to 9d to electrically connect these electrodes to the outside by wire bonding or the like.

A rear protective film 10 is first formed on a side opposite to the base film 2 side of the plate substrate 1, and an etching hole 11 is formed by photolithography and wet or dry etching. Thereafter, part of the plate substrate 1 is removed from the rear side by alkali etching or the like through the etching hole 11 to form a cavity 12 which has a trapezoidal section and does not communicate with the front side of the plate substrate 1, whereby a thin diaphragm 13 is formed on the bottom side of the cavity 12, that is, the front side of the plate substrate 1. The diaphragm measures 0.9 mm×2 mm, for example.

By forming the diaphragm 13, as shown by slant lines of FIG. 1(a), the first additional patterns 6a and 6b and the connection patterns 5a and 5b are formed on the diaphragm 13 at positions where they are almost symmetrical about the center axis in a transverse direction of the diaphragm 13 (or the center of the diaphragm 13). Therefore, the thin film patterns formed on the diaphragm 13 are almost symmetrical about the center axis in a longitudinal direction and a transverse direction of the diaphragm 13 by forming the first additional patterns 6a and 6b.

An arrow V of FIG. 1(a) shows the flow direction of a fluid to be measured. The flow detection element 21 is arranged in the passage of the fluid such that the heating element 3 side (front side) of the plate substrate 1 becomes parallel to the flow of the fluid and the longitudinal direction of the heating element 3 becomes perpendicular to the flow.

In FIGS. 1(a) and 1(b), to make more understandable the constitution of the flow detection element 21, the size of each portion is depicted different from its actual size, for example, the pattern of the heating element 3 is depicted wider. The same is said of other embodiments shown below.

Figure 2A:
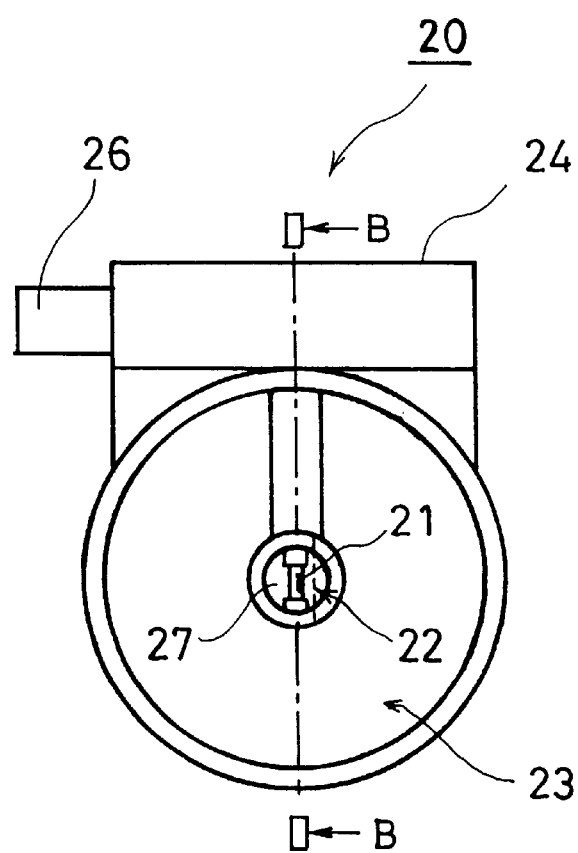
Figure 2B:
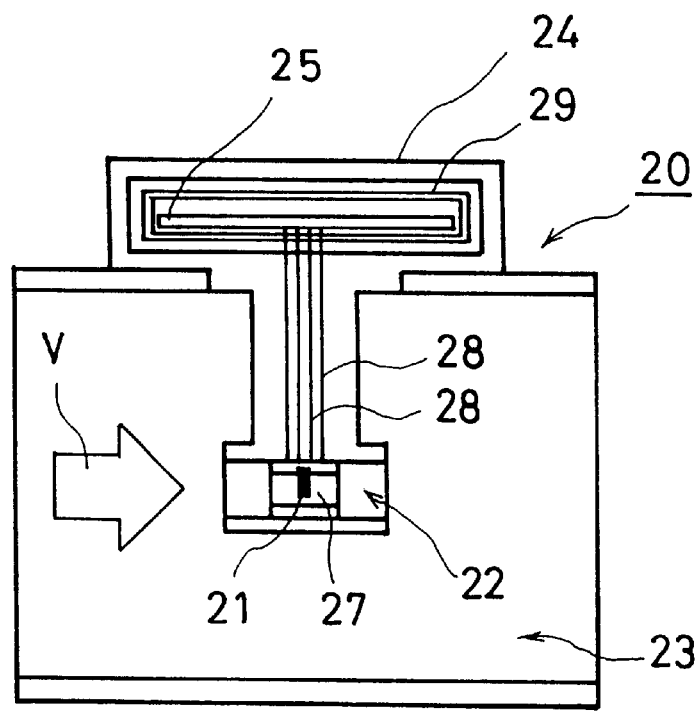

FIGS. 2(a) and 2(b) are diagrams showing the constitution of a flow sensor 20 using the above flow detection element 21. FIG. 2(a) is a front view and FIG. 2(b) is a sectional view cut on line B—B of FIG. 2(a). In FIGS. 2(a) and 2(b), reference numeral 21 represents a flow detection element, 22 a detection pipeline, 23 a main fluid passage, 24 a case which stores a control circuit board 25, and 26 a connector for supplying power to the flow sensor 20 or receiving the output of the flow sensor 20. The flow detection element 21 is mounted on the surface of a plate holder 27 installed in the detection pipeline 22. Reference numeral 28 denotes a lead wire for electrically connecting the flow detection element 21 to the control circuit board 25, and 29 a shielding member for protecting the control circuit board 25 from disturbance noise such as electromagnetic waves. The constitution of the flow sensor 20 shown in FIGS. 2(a) and 2(b) is the same as those of other embodiments which will be described hereinafter.

Figure 3:
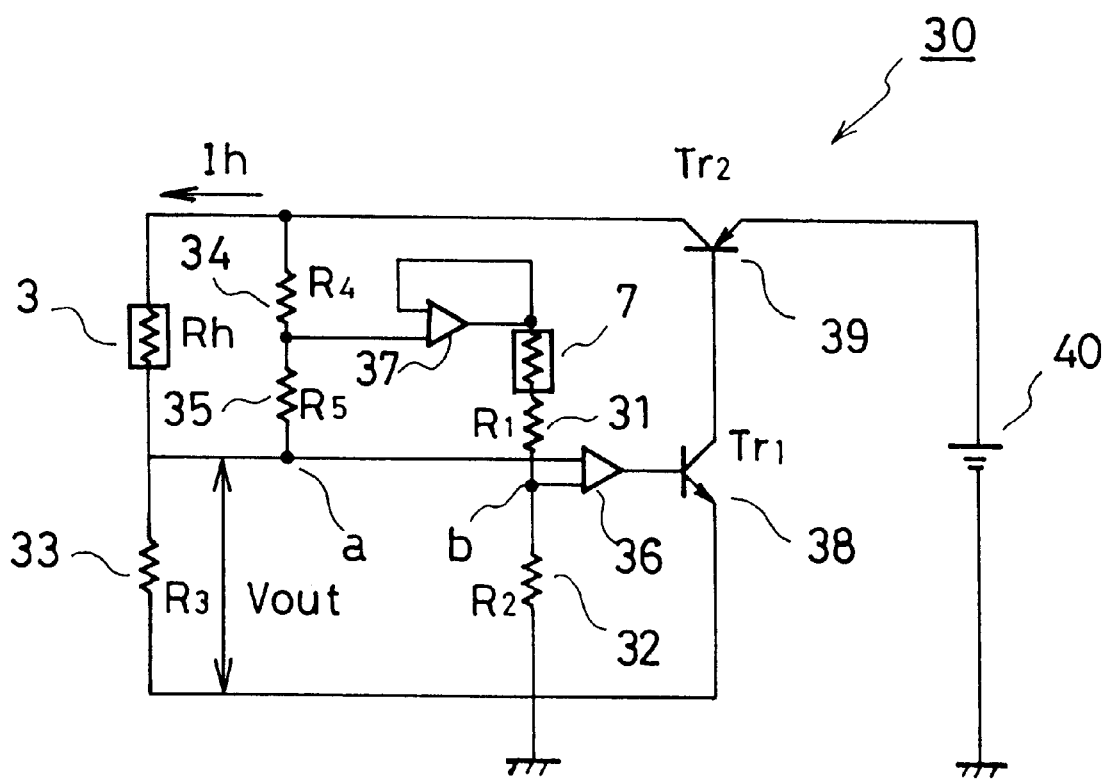
FIG. 3 is a diagram showing the constitution of a control circuit of the flow sensor of Embodiment 1.

FIG. 3 is a circuit diagram showing the constitution of a control circuit for controlling the heating element 3 of the flow detection element 21 to such a resistance value that the average temperature of the heating element 3 becomes a predetermined value. The control circuit 30 is a bridge circuit containing the fluid temperature measuring element 7 and the heating element 3. Denoted by 31 to 35 are fixed resistors having resistance values R1, R2, R2, R4 and R5, respectively, 36 and 37 operational amplifiers, 38 and 39 are transistors (Tr1 and Tr2), and 40 a power source.

The constituent parts excluding the heating element 3 and the fluid temperature measuring element 7 of the control circuit 30 are arranged on the control circuit board 25 of FIGS. 2(*a*) and 2(*b*).

The control circuit 30 controls a heating current Ih to be applied to the heating element 3 so that potentials at points "a" and "b" shown in FIG. 3 become substantially equal to each other. When the flow velocity of a fluid to be measured increases, heat transmitted from the heating element 3 to the fluid to be measured grows, whereby a heating current Ih for maintaining the average temperature of the heating element 3 at a predetermined value increases. By detecting the size of the heating current as a voltage Vout at both ends of the resistor 33 (R3), the flow velocity of the fluid to be measured or the flow rate of the fluid flowing through the passage having a predetermined cross section can be detected.

That is, when the resistance value of the heating element 3 is represented by Rh, the average temperature of the heating element 3 Th, the temperature of the fluid to be measured Ta and the flow rate of the fluid flowing through the passage having a predetermined cross section Q, the following equation (1) is established.

$$Ih^2 \times Rh = (a + b \times Q^n) \times (Th - Ta) \quad (1)$$

"A", "b" and "n" are constants determined by the flow detection element 21.

Stated more specifically, "a" is a coefficient corresponding to the quantity of heat not dependent upon the flow rate Q, most of which is a heat transfer loss transmitted from the heating element 3 to the plate substrate 1, and "b" is a coefficient corresponding to forced convective heat transfer. "N" is a value determined by a flow near the heating element 3, which is ca. 0.5.

As is evident from the above equation (1), the quantity of heat corresponding to the coefficient "a" does not contribute to the detection of the flow rate. Therefore, it is understood that, to improve the sensitivity of the flow sensor 20, a heat transfer loss transmitted from the heating element 3 to the plate substrate 1 must be reduced. Further, the output follow-up properties, that is, responsibility of the flow sensor 20 when the flow rate Q is changed can be improved by reducing the heat capacity of the diaphragm 13 by reducing the thickness of the diaphragm 13 on which the heating element 3 is formed. Further, the time elapsed from the time when power is supplied to the flow sensor 20 to the time when the flow sensor 20 outputs an accurate flow signal becomes shorter as a heat flow going from the heating element 3 to the plate substrate 1 having a large heat capacity reduces. Then, in this Embodiment 1, the thickness of the diaphragm 13 is reduced to 2 µm (pattern forming portion is 2.2 µm) to diminish the heat flow from the heating element to the plate substrate 1.

The diaphragm 13 has portions with a pattern and portions without a pattern in a film layer direction (thickness direction). In this Embodiment 1, as shown in FIG. 1(*a*), since thin film patterns are formed such that they are almost symmetrical within the plane of the diaphragm 13, the deformation of the diaphragm 13 caused by internal stress or the differences of mechanical or thermal properties between a silicon nitride film forming the base film 2 and the protective film 8 and a platinum film forming the thin-film patterns is suppressed.

Even when deformation occurs, the deformed shape is symmetrical, whereby stress produced between the films by the deformation is reduced, thereby making it possible to prevent separation between films. Since the amount of deformation of the diaphragm 13 can be reduced and the deformed shape of the diaphragm 13 can be made symmetrical, differences in the deformation are small even when power is supplied to the heating element 3. Therefore, the flow detection characteristics of the flow sensor 20 become uniform and a high-accuracy flow sensor can be obtained.

Further, in this Embodiment 1, when the thickness of the diaphragm is 1, the thickness of the pattern of the heating element 3, the thickness of the connection patterns 5*a* and 5*b* and the thickness of the first additional patterns 6*a* and 6*b* are small at 0.1, thereby making it possible to reduce the influence of the thickness of the pattern on the film layer structure of the diaphragm 13. Even if the thin film patterns are not perfectly symmetrical within the plane of the diaphragm 13, when they are almost symmetrical, the deformation of the diaphragm 13 can be fully suppressed. When the thickness of the pattern of the heating element 3, the thickness of the connection patterns 5*a* and 5*b*, and the thickness of the first additional patterns 6*a* and 6*b* are ⅕ or less the thickness of the diaphragm, the deformation of the diaphragm 13 can be fully suppressed.

In this Embodiment 1, as the pattern of the heating element 3, the connection patterns 5*a* and 5*b*, and the additional patterns 6*a* and 6*b* are made of the same metal layer such as a platinum layer, these patterns can be formed at the same time in the production of the flow sensor. Therefore, the production process can be simplified and the cost of the flow sensor 20 can be reduced.

Embodiment 2

Figure 4:
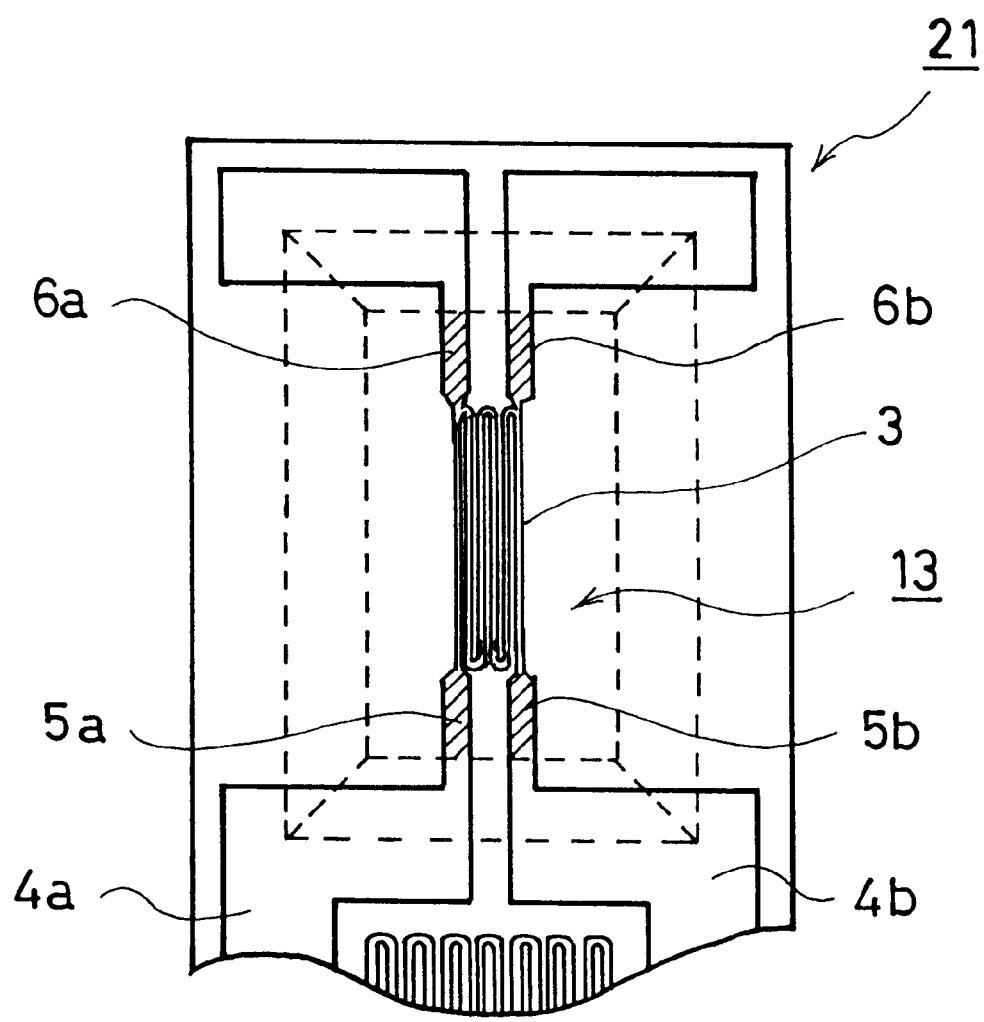
FIG. 4 is a diagram showing a diaphragm and a portion therearound of a flow detection element according to Embodiment 2 of the present invention.

FIG. 4 is a diagram showing a diaphragm and a portion therearound of a flow detection element 21 according to Embodiment 2 of the present invention. In this Embodiment 2, the first additional patterns 6*a* and 6*b* of Embodiment 1 shown in FIG. 1(*a*) are connected to the pattern of the heating element 3 and completely symmetrical to the connection patterns 5*a* and 5*b*. Thereby, the symmetry of the thin film patterns formed on the diaphragm 13 can be further improved and the deformation of the diaphragm 13 can be further suppressed.

Embodiment 3

Figure 5:
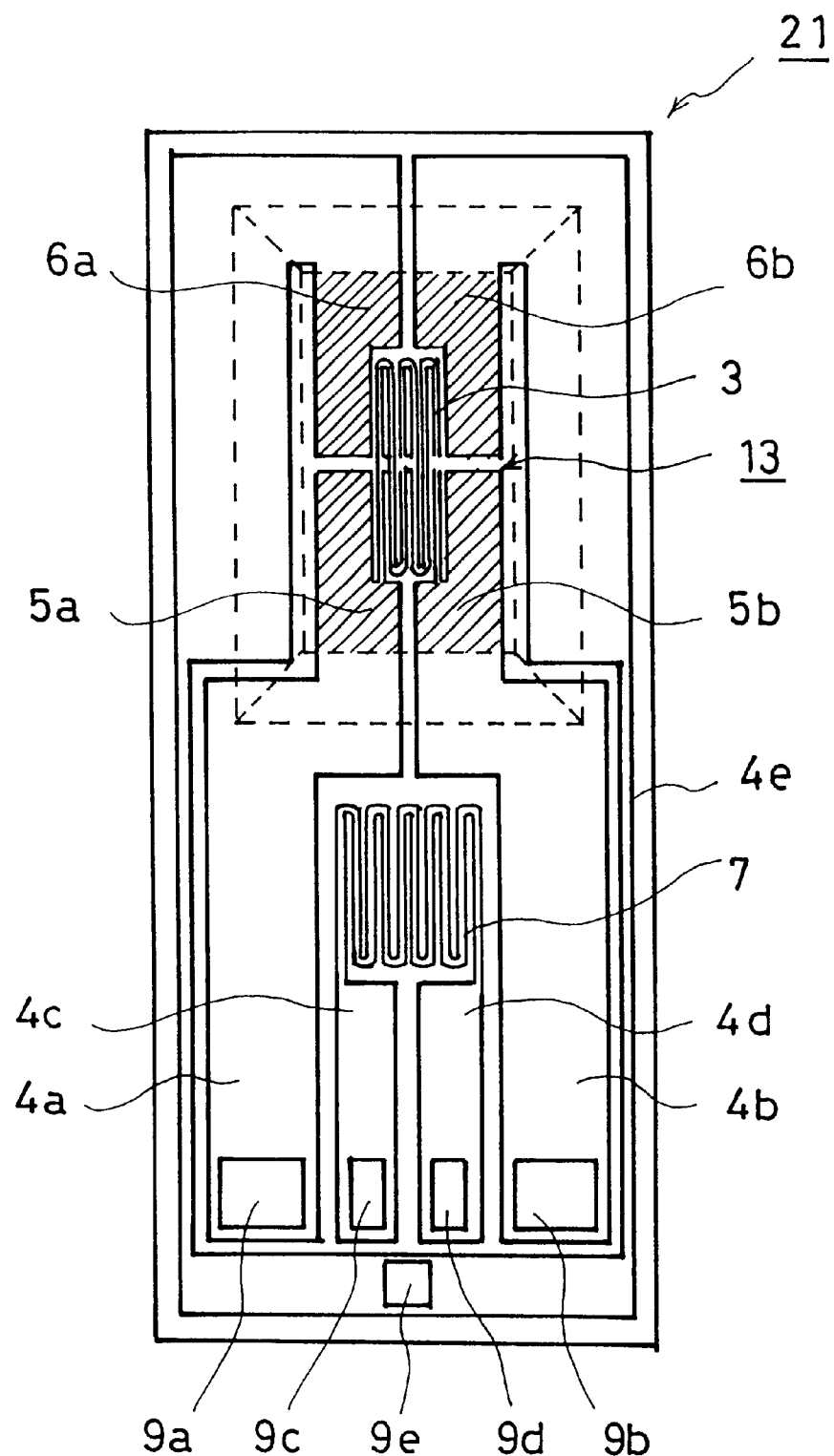
FIG. 5 is a plan view showing the constitution of a flow detection element according to Embodiment 3 of the present invention.

FIG. 5 is a plan view showing the constitution of a flow detection element 21 according to Embodiment 3 of the present invention. In FIG. 5, the connection patterns 5*a* and 5*b* are formed to surround a lower portion 3 (the flow temperature measuring element 7 side) of the heating element, and the first connection patterns 6*a* and 6*b* are formed at positions where they are symmetrical to the connection patterns 5*a* and 5*b* to surround an upper portion of the heating element 3. The first connection patterns 6*a* and 6*b* are dummy patterns which do not contribute to power supply to the heating element 3 and are not electrically connected to the heating element 3 but to an electrode 9*e* by a lead pattern 4*e* formed on a wide portion of the plate substrate 1 excluding the heating element 3 and the power lines of the fluid temperature measuring element 7. This electrode 9*e* is connected to the ground of the control circuit board 25 shown in FIG. 2 or the shielding member 29 of the flow sensor 20 by wire bonding or the like. In FIG. 5, the connection of the electrode 9*e* is omitted.

Thus, by forming a pattern connected to the ground or the shielding member around the heating element 3 or the power lines of the fluid temperature measuring element 7, an AC component of noise can be removed even when the flow detection element 21 is exposed to disturbance noise such as electromagnetic waves, thereby preventing the erroneous operation and erroneous output of the flow sensor.

Embodiment 4

Figure 6:
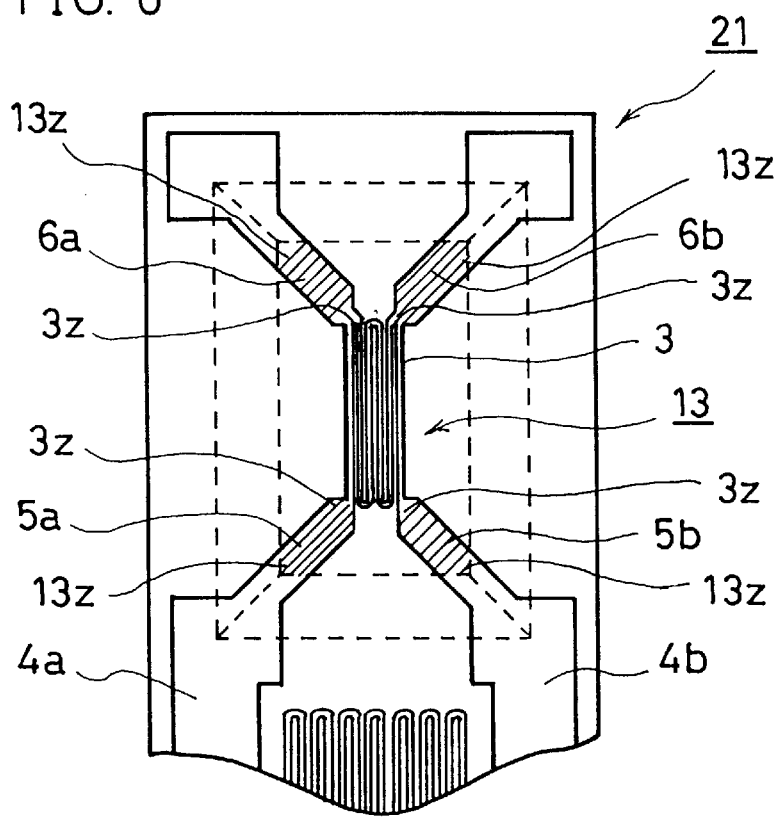
FIG. 6 is a diagram showing a diaphragm and a portion therearound of a flow detection element according to Embodiment 4 of the present invention.

FIG. 6 is a diagram showing a diaphragm and a portion therearound of a flow detection element 21 according to Embodiment 4 of the present invention. In this Embodiment 4, the connection patterns 5a and 5b and the first additional patterns 6a and 6b are formed on lines connecting corner portions 3z of the pattern of the heating element 3 and corner portions 13z of the diaphragm 13, respectively. Thereby, film layer structures at the four corners of the diaphragm 13 become almost the same, thereby making it possible to further improve the effect of reducing the amount of deformation of the diaphragm 13 and the effect of making the deformed shape of the diaphragm 13 symmetrical.

In FIG. 6, the first additional patterns 6a and 6b are connected to the pattern of the heating element 3. If they are not connected to the pattern of the heating element 3, the effect of reducing the amount of deformation of the diaphragm 13 and the effect of making the deformed shape symmetrical can be fully improved.

Embodiment 5

Figure 7:
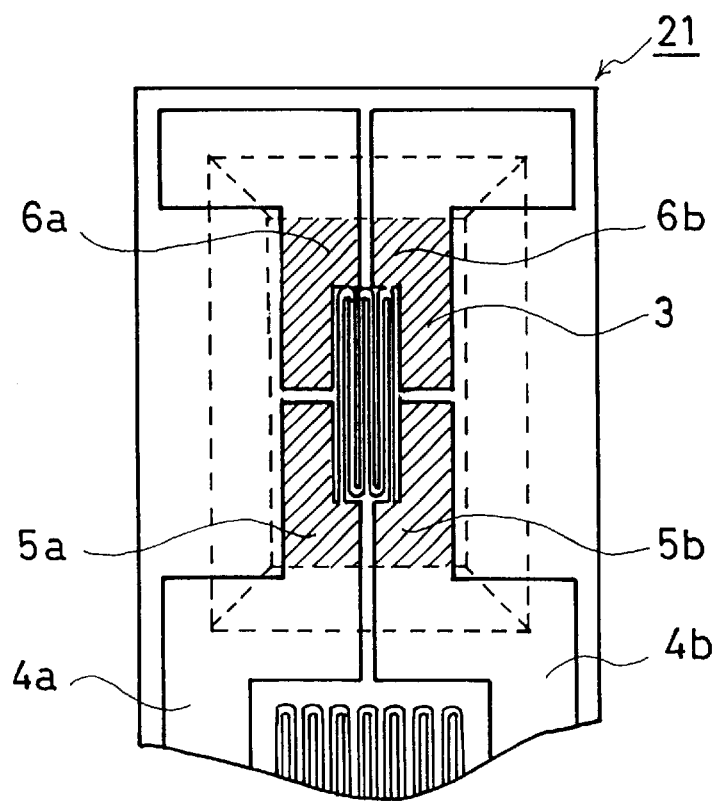
FIG. 7 is a diagram showing a diaphragm and a portion therearound of a flow detection element according to Embodiment 5 of the present invention.

FIG. 7 is a diagram showing a diaphragm and a portion therearound of a flow detection element 21 according to Embodiment 5 of the present invention. In this Embodiment 5, the connection patterns 5a and 5b and the first additional patterns 6a and 6b are formed to cover the diaphragm 13 excluding the pattern of the heating element 3 and to surround the pattern of the heating element 3, and the total area of the connection patterns 5 and 5b and the first additional patterns 6a and 6b is half or more the area of the diaphragm 13 excluding the heating pattern on the diaphragm 13. Thereby, most of the area of the diaphragm 13 has a film layer structure containing a pattern forming film and the film layer structure of the diaphragm 13 can be considered as almost uniform, thereby further improving the effect of reducing the amount of deformation of the diaphragm and the effect of making the deformed shape symmetrical.

Embodiment 6

Figure 8:
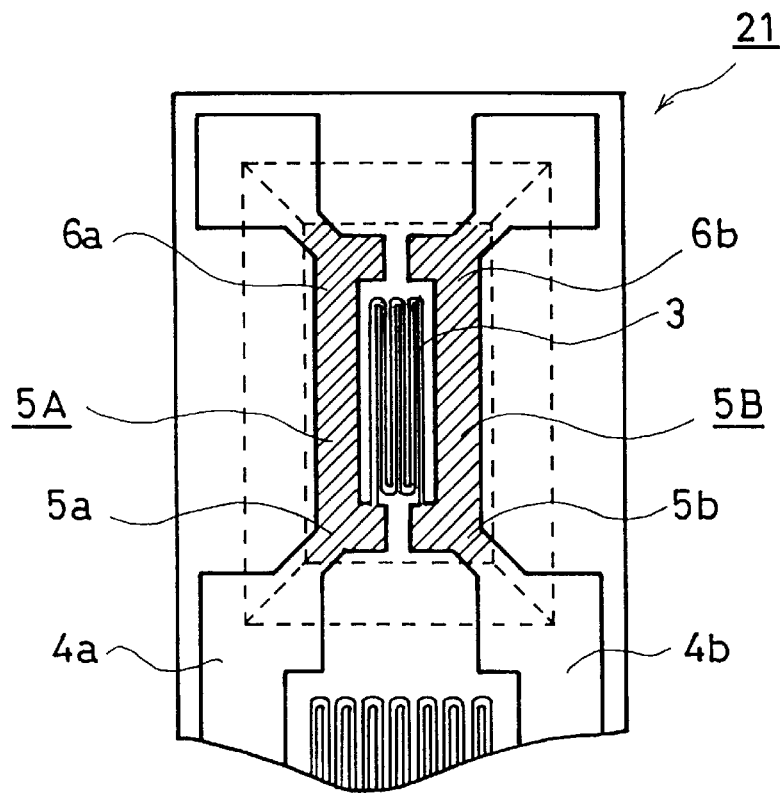
FIG. 8 is a diagram showing a diaphragm and a portion therearound of a flow detection element according to Embodiment 6 of the present invention.

FIG. 8 is a diagram showing a diaphragm and a portion therearound of a flow detection element 21 according to Embodiment 6 of the present invention. In this Embodiment 6, the connection patterns 5a and 5b covering wide a lower portion of the diaphragm 13 excluding the pattern of the heating element 3 are connected to the first additional patterns 6a and 6bcovering wide an upper portion of the diaphragm 13 excluding the pattern of the heating element 3 and formed symmetrical to the connection patterns 5a and 5b on the diaphragm 13 to form connection patterns 5A and 5B, respectively, and further the connection patterns 5A and 5B extend over lines connecting the corner portions of the pattern of the heating element 3 and the corner portions of the diaphragm 13. The total area of the connection patterns 5A and 5B is half or more the area of the diaphragm 13 excluding the heating pattern.

Thereby, there is no boundary between the connection patterns 5a and 5b and the first additional patterns 6a and 6b, thereby simplifying the patterns in the plane direction of the diaphragm 13. Therefore, as differences in strength and deformation caused by the nonuniformity of the film layer structure can be reduced, the effect of reducing the amount of deformation of the diaphragm and the effect of making the deformed shape symmetrical can be further improved and a more reliable flow sensor can be obtained.

Embodiment 7

Figure 9:
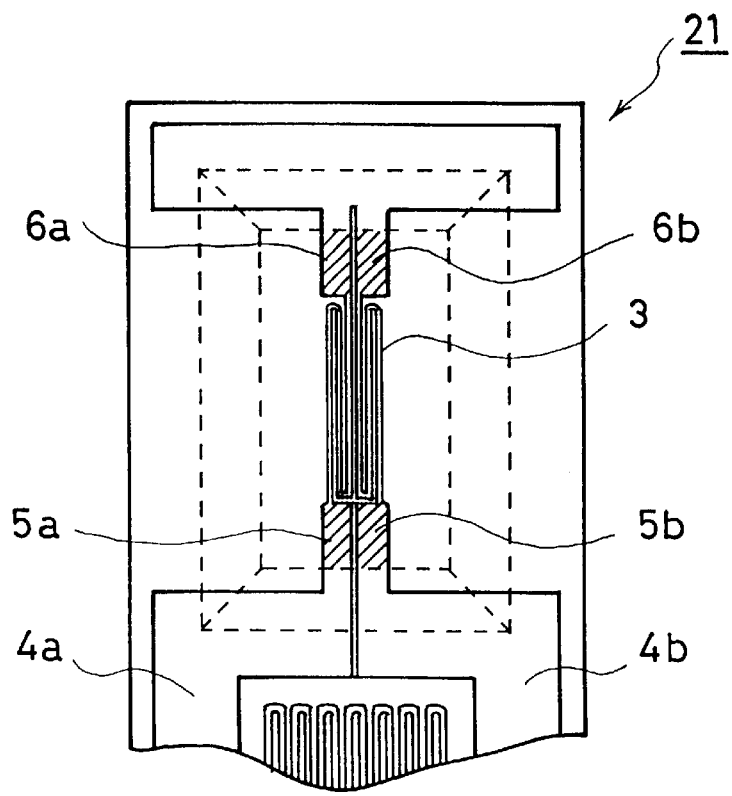
FIG. 9 is a diagram showing a diaphragm and a portion therearound of a flow detection element according to Embodiment 7 of the present invention.

FIG. 9 is a diagram showing a diaphragm and a portion therearound of a flow detection element 21 according to Embodiment 7 of the present invention. In this Embodiment 7, the first additional patterns 6a and 6b are made a current path for the heating element 3, and the pattern width of the first additional patterns 6a and 6b is made larger than the pattern width of the heating element 3. Thereby, the quantity of heat generated from the connection patterns 5a and 5b can be made almost equal to that of the first additional patterns 6a and 6b. Therefore, a diaphragm 13 having a symmetrical structure in terms of shape and temperature can be constructed and a flow sensor which further improves the effect of reducing the amount of deformation of the diaphragm 13 and the effect of making the deformed shape symmetrical can be obtained.

Embodiment 8

FIGS. 10(a) and 10(b) are diagrams showing the constitution of a flow detection element 21 according to Embodiment 8 of the present invention. In addition to the pattern of the heating element 3, the connection patterns 5a and 5b, and the first additional patterns 6a and 6b of Embodiment 2 (FIG. 4), second additional patterns 14a, 14b, 14c and 14d which are dummy patterns and do not contribute to power supply to the heating element 3 are formed at positions where they are almost symmetrical to one another in the area of the diaphragm 13 excluding the power lines.

That is, the second additional patterns 14a and 14b having a wide area are formed to sandwich a portion where the pattern of the heating element 3, the connection patterns 5a and 5b, and the first additional patterns 6a and 6b are formed on the diaphragm 13 from a transverse direction, and the second additional patterns 14c and 14d are formed in the gap between the connection patterns 5a and 5b and the gap between the first additional patterns 6a and 6b to fill these gaps, respectively, whereby the thin film patterns on the diaphragm 13 become almost symmetrical and a great portion of the diaphragm 13 has a film layer structure containing a pattern forming film.

Thereby, the film layer structure of the diaphragm 13 can be made almost uniform and the effect of reducing the amount of deformation of the diaphragm 13 and the effect of making the deformed shape symmetrical can be further improved.

Since the above second additional patterns 14a, 14b, 14c and 14d are present only on the diaphragm 13 and not other portion of the plate substrate 1, the heat of the heating element 3 hardly escapes into the plate substrate 1, thereby improving the responsibility and sensitivity of the flow sensor.

The second additional patterns 14a, 14b, 14c and 14d are formed of the same metal layer such as a platinum layer as that of the heating element 3, and the thickness of the patterns is designed to be $\frac{1}{5}$ or less the thickness of the diaphragm 13. Therefore, the production process can be simplified, the cost of the flow sensor 20,can be reduced, and the deformation of the diaphragm 13 can be fully suppressed.

Embodiment 9

FIG. 11 is a diagram showing a diaphragm and a portion therearound of a flow detection element 21 according to Embodiment 9 of the present invention. In this Embodiment 9, in addition to the pattern of the heating element 3, the connection patterns 5a and 5b, the first additional patterns 6a and 6b, and the second additional patterns 14a, 14b, 14c and 14d of the above Embodiment 8 (FIG. 10(a)), third additional patterns 15a and 15b are formed outside the second additional patterns 14a and 14b at the periphery of the diaphragm 13, third additional patterns 15c and 15d are formed in the gap between the connection patterns 5a and 5b and the gap between the first additional patterns 6a and 6b at the periphery of the diaphragm 13 to fill these gaps, respectively, and connection patterns 16a and 16b are formed to connect the second additional patterns 14a to the third additional pattern 15a and the second additional pattern 14b to the third additional pattern 15b, respectively.

The pattern width of the connection patterns 16a and 16b are set such that the total of the widths of the connection patterns 16a and 16b at the boundary of the diaphragm 13 is half or less the whole circumference of the boundary.

Thereby, the film layer structure of the diaphragm 13 can be made almost uniform, the nonuniformity of the film layer structure at the boundary of the diaphragm 13 can be minimized because the connection patterns 16a and 16b are formed at the boundary of the diaphragm 13 to bridge the diaphragm 13, and a reduction in the strength of a portion near the boundary of the diaphragm 13 can be suppressed. Further, as the total of the widths of the connection patterns 16a and 16b at the boundary of the diaphragm 13 is made half or less the whole circumference of the boundary, heat escaping from the heating portion 3 to the plate substrate 1 is suppressed, thereby making it possible to improve the responsibility and sensitivity of the flow sensor.

Embodiment 10

In the above Embodiment 9, the third additional patterns 15a and 15b are formed at the periphery of the diaphragm 13, the third additional patterns 15c and 15d are formed in the gap between the connection patterns 5a and 5b and the gap between the first additional patterns 6a and 6b, and the connection patterns 16a and 16b are formed to connect the second additional patterns 14a and 14b to the third additional patterns 15 and 15b, respectively. In this Embodiment 10, a lead pattern 4f is formed to surround the power lines of the fluid temperature measuring element 7 on the plate substrate 1 and combined with the third additional patterns 15a and 15b, and a lead pattern 17 is formed by combining the second additional patterns 14a and 14b on a side opposite to the fluid temperature measuring element 7 side of the heating element 3 and the third additional patterns 15a and 15b and further the second additional patterns 14c and 14d so as to surround the power lines of the fluid temperature measuring element 7 and the heating element 3.

The above lead pattern 17 is connected to the electrode 9e which is connected to the ground of the control circuit board 25 or the shielding member 29 of the flow sensor 20 shown in FIG. 2 by wire bonding or the like. In FIG. 12, the connection of the electrode 9e is omitted. Thereby, even when the flow detection element 21 is exposed to disturbance noise such as electromagnetic waves, an AC component of noise can be removed and the erroneous operation and erroneous output of the flow sensor can be prevented.

In the above Embodiments 8, 9 and 10, in addition to the first additional patterns 6a and 6b symmetrical to the connection patterns 5a and 5b, the second additional patterns 14a, 14b, 14c and 14d are formed. It is needless to say that the deformation of the diaphragm 13 can be suppressed by forming the additional patterns such as the second additional patterns 14a, 14b, 14c and 14d to ensure that the thin film patterns formed on the surface of the diaphragm 13 become almost symmetrical on the diaphragm 13 without the first additional patterns 6a and 6b. At this point, when the total area of the additional patterns is made half or more the area of the diaphragm 13 excluding the heating pattern, the film layer structure of the diaphragm 13 can be considered as almost uniform and the effect of reducing the amount of deformation of the diaphragm 13 and the effect of making the deformed shape symmetrical can be further improved.

In the above embodiments, the flow sensor using the flow detection element 21 in which the heating element 3 is formed on the diaphragm 13 and the fluid temperature measuring element 7 is formed outside the diaphragm 13 away from the heating element 3 on the plate substrate 1 has been described. Even in a flow sensor using a flow detection element such as the above-described flow detection element 51 of the prior art in which the heating element 3 and the resistance thermometers 52 and 52 are formed on the diaphragm 13, additional patterns are formed so that the thin film patterns formed on the surface of the diaphragm of the flow detection element become almost symmetrical on the diaphragm regardless of the existence of slit portions, thereby making it possible to suppress the deformation of the diaphragm and to obtain a flow sensor having high sensitivity and responsibility.

As having been described above, according to the first aspect of the present invention, since additional patterns are formed on the diaphragm or both the diaphragm and a portion therearound so that the thin film patterns formed on the surface of the diaphragm which is formed in the plate substrate of the flow detection element become almost symmetrical, whereby the amount of deformation of the diaphragm can be reduced and the deformed shape of the diaphragm can be made symmetrical whether or not power is supplied to the heating portion. Therefore, a flow sensor having excellent reproducibility and reliability can be obtained.

According to the second aspect of the present invention, the first additional patterns are formed at positions where they are almost symmetrical to the connection patterns on the diaphragm so that the thin film patterns formed on the diaphragm become almost symmetrical on the diaphragm. Therefore, the deviation of the patterns on the diaphragm caused by the connection patterns can be reduced and the deformed shape of the diaphragm can be made symmetrical.

According to the third aspect of the present invention, the first additional patterns are dummy patterns which do not contribute to power supply to the heating element and a temperature rise caused by the first additional patterns is prevented. Therefore, the influence of heat transfer to the fluid to be measured can be minimized.

According to the fourth aspect of the present invention, since the first additional patterns are connected to the pattern of the heating element, the symmetry of the thin film patterns on the diaphragm can be enhanced and the deformation of the diaphragm can be further suppressed.

According to the fifth aspect of the present invention, since the first additional patterns are not connected to the pattern of the heating element but to the ground of the flow detection circuit or the shielding member of the flow sensor, even when the flow detection element is exposed to disturbance noise such as electromagnetic waves, an AC component of noise can be removed and the erroneous operation and erroneous output of the flow sensor can be prevented.

According to the sixth aspect of the present invention, since the connection patterns and the first additional patterns are formed on the lines connecting the corner portions of the pattern of the heating element and the corner portions of the diaphragm, respectively, the film layer structures of the corner portions of the diaphragm become almost the same and the effect of reducing the amount of deformation of the diaphragm and the effect of making the deformed shape symmetrical can be improved.

According to the seventh aspect of the present invention, since the connection patterns are formed to surround at least part of the pattern of the heating element, the film layer structure of a portion near the heating element can be made uniform and the deformation of the diaphragm can be suppressed.

According to the eighth aspect of the present invention, the total area of the connection patterns and the first additional patterns is half or more the area of the diaphragm excluding the pattern of the heating element and a great portion of the diaphragm has a film layer structure containing a pattern forming film. Therefore, the film layer structure of the diaphragm can be made almost uniform and the effect of reducing the amount of deformation of the diaphragm and the effect of making the deformed shape symmetrical can be further improved.

According to the ninth aspect of the present invention, since the connection patterns are combined with the first additional patterns, there is no boundary between the connection patterns and the first additional patterns, thereby simplifying the patterns in a plane direction of the diaphragm and reducing the differences of strength and deformation caused by the nonuniformity of the film layer structure. Therefore, the effect of reducing the amount of deformation of the diaphragm and the effect of making the deformed shape symmetrical can be further improved.

According to the tenth aspect of the present invention, since the with of the first additional patterns is larger than the width of the pattern of the heating element and the first additional patterns form part of a current path for the heating element, the quantity of heat generated from the connection patterns can be made almost equal to the quantity of heat generated from the first additional patterns and a diaphragm which is symmetrical in terms of shape and temperature can be constructed.

According to the eleventh aspect of the present invention, since the pattern of the heating element, the connection patterns and the first additional patterns are formed of the same metal layer, the production process can be simplified and the cost of the flow sensor can be reduced.

According to the twelfth aspect of the present invention, since the thickness of the pattern of the heating element, the thickness of the connection patterns and the thickness of the first additional patterns are ⅕ or less the thickness of the diaphragm to reduce the influence of the pattern thickness on the film layer structure of the diaphragm, even if the thin film patterns are not completely symmetrical within the plane of the diaphragm but almost symmetrical, the deformation of the diaphragm can be fully suppressed.

According to the thirteenth aspect of the present invention, since the second additional patterns are dummy patterns formed in an area other than the power lines of the diaphragm and formed at positions where they are almost symmetrical on the diaphragm, the film layer structure of the diaphragm can be made almost uniform, the heat of the heating portion is made difficult to escape into the plate substrate, and the responsibility and sensitivity of the flow sensor can be further improved.

According to the fourteenth aspect of the present invention, the third additional patterns are formed at the periphery of the diaphragm, the connection patterns are formed to connect the third additional patterns to the dummy patterns, and the total of the widths of the connection patterns at the boundary of the diaphragm is half or less the whole circumference of the boundary of the diaphragm. Therefore, the nonuniformity of the film layer structure of the boundary of the diaphragm can be reduced, a reduction in the strength of a portion near the boundary of the diaphragm can be suppressed, and heat escaping from the heating portion to the plate substrate can be reduced, thereby making it possible to further improve the responsibility and sensitivity of the flow sensor.

According to the fifteenth aspect of the present invention, the third additional patterns are not connected to the pattern of the heating element but to the ground of the flow detection circuit or the shielding member of the flow sensor. Therefore, even when the flow detection element is exposed to disturbance noise such as electromagnetic waves, an AC component of noise can be removed and the erroneous operation and erroneous output of the flow sensor can be prevented.

According to the sixteenth aspect of the present invention, since the connection patterns are laid over the corner portions of the diaphragm, the film layer structures of the corner portions of the diaphragm can be made almost the same, and the effect of reducing the amount of deformation of the diaphragm and the effect of making the deformed shape symmetrical can be further improved.

According to the seventeenth aspect of the present invention, since the second additional patterns are formed to surround at least part of the pattern of the heating element, the film layer structure near the heating element can be made uniform and the deformation of the diaphragm can be suppressed.

According to the eighteenth aspect of the present invention, since the total area of the second additional patterns on the diaphragm is half or more the area of the diaphragm excluding the pattern of the heating element, a great portion of the diaphragm has a film layer structure containing a pattern forming film and the film layer structure of the diaphragm can be made almost uniform.

According to the nineteenth aspect of the present invention, since the pattern of the heating element and the second additional patterns are formed of the same metal layer, the production process can be simplified and the cost of the flow sensor can be reduced.

According to the twentieth aspect of the present invention, since the thickness of the pattern of the heating element and the thickness of the second additional patterns are ⅕ or less the thickness of the diaphragm, the influence of the pattern thickness on the film layer structure of the diaphragm can be minimized and the deformation of the diaphragm can be fully suppressed.

What is claimed is:

1. A flow sensor for measuring the flow rate of a fluid flowing over a flow detection element by supplying power to a heating element, the flow detection element comprising:

a diaphragm formed by removing part of a substrate;

a heating element made of a heat sensitive resistor film and formed on the diaphragm;

electrode portions for the heating element formed on the substrate;

lead patterns extending from the electrode portions to a portion near the diaphragm; and connection patterns, at least part of which are formed on the diaphragm, for connecting the lead patterns to a patter of the heating element, wherein additional patterns are formed on the diaphragm or the diaphragm and a portion therearound so that a tin film pattern including the additional patterns formed on the diaphragm become substantially symmetrical on the diaphragm with respect to a center axis in a longitudinal direction and a transverse direction of the diaphragm.

2. The flow sensor according to claim 1, wherein the additional patterns are formed at positions where they are substantially symmetrical to the connection patterns on the diaphragm.

3. The flow sensor according to claim 2, wherein the additional patterns are dummy patterns which do not contribute to power supply to the heating element.

4. The flow sensor according to claim 3, wherein the dummy patterns are connected to the pattern of the heating element.

5. The flow sensor according to claim 3, wherein the dummy patterns are not connected to the pattern of the heating element but to the ground of a flow detection circuit or the shielding member of the flow sensor.

6. The flow sensor according to claim 2, wherein the connection patterns and the additional patterns are formed on lines connecting the corner portions of the pattern of the heating element and the corner portions of the diaphragm, respectively.

7. The flow sensor according to claim 2, wherein the connection patterns are formed to surround at least part of the pattern of the heating element.

8. The flow sensor according to claim 2, wherein the total area of the connection patterns and the additional patterns is half or more the area of the diaphragm excluding the pattern of the heating element.

9. The flow sensor according to claim 2, wherein the connection patterns are combined with the additional patterns.

10. The flow sensor according to claim 2, wherein the width of the additional patterns is larger than the width of the pattern of the heating element and the additional patterns form part of a current path for the heating element.

11. The flow sensor according to claim 2, wherein the pattern of the heating element, the connection patterns and the first additional patterns are formed of the same metal layer.

12. The flow sensor according to claim 2, wherein the thickness of the pattern of the heating element, the thickness of the connection patterns and the thickness of the first additional patterns are $1/5$ or less the thickness of the diaphragm.

13. The flow sensor according to claim 1, wherein the additional patterns are dummy patterns formed in an area other than power lines of the diaphragm and formed at positions where they are substantially symmetrical on the diaphragm.

14. The flow sensor according to claim 13, wherein third additional patterns formed at the periphery of the diaphragm and connection patterns for connecting the third patterns to the dummy patterns are formed, and the total of the widths of the connection patterns at the boundary of the diaphragm is half or less the whole circumference of the boundary of the diaphragm.

15. The flow sensor according to claim 14, wherein the third additional patterns are not connected to the pattern of the heating element but to the ground of a flow detection circuit or the shielding member of the flow sensor.

16. The flow sensor according to claim 14, wherein the connection patterns are laid over the corner portions of the diaphragm.

17. The flow sensor according to claim 13, wherein the dummy patterns are formed to surround at least part of the pattern of the heating element.

18. The flow sensor according to claim 13, wherein the total area of the dummy patterns on the diaphragm is half or more the area of the diaphragm excluding the pattern of the heating element.

19. The flow sensor according to claim 13, wherein the pattern of the heating element and the dummy patterns are formed of the same metal layer.

20. The flow sensor according to claim 13, wherein the thickness of the pattern of the heating element and the thickness of the dummy patterns are $1/5$ or less the thickness of the diaphragm.

21. The flow sensor according to claim 1, wherein said additional patterns are configured to ensure symmetrical deformation of said diaphragm during operation.

22. The flow sensor according to claim 21, wherein said additional patterns are configured to suppress deformation of said diaphragm during operation.

* * * * *